United States Patent
Backman et al.

(10) Patent No.: US 7,086,421 B2
(45) Date of Patent: Aug. 8, 2006

(54) CROSSLINKED POLYETHYLENE PIPE HAVING A HIGH DENSITY POLYETHYLENE LINER

(75) Inventors: Arthur L. Backman, Broadview Heights, OH (US); Girish T. Dalal, Avon Lake, OH (US); Carl M. Mahabir, Streetsboro, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 273 days.

(21) Appl. No.: 10/616,601

(22) Filed: Jul. 10, 2003

(65) Prior Publication Data

US 2004/0045619 A1 Mar. 11, 2004

Related U.S. Application Data

(60) Provisional application No. 60/397,862, filed on Jul. 23, 2002.

(51) Int. Cl.
*F16L 11/04* (2006.01)

(52) U.S. Cl. ............... 138/137; 138/141; 428/36.91

(58) Field of Classification Search ........... 138/137, 138/141; 428/36.91
See application file for complete search history.

(56) References Cited

U.S. PATENT DOCUMENTS

| 2,916,481 A | * | 12/1959 | Gilmont ............ 525/387 |
| 3,033,238 A | * | 5/1962 | Kosewicz ............ 138/141 |
| 3,096,210 A | * | 7/1963 | Boonstra ............ 428/368 |
| 3,292,539 A | * | 12/1966 | Behr et al. ............ 102/466 |
| 4,101,699 A | * | 7/1978 | Stine et al. ............ 428/36.91 |
| 4,117,195 A | | 9/1978 | Swarbrick et al. ............ 428/379 |
| 4,614,208 A | | 9/1986 | Skarelius ............ 138/103 |
| 5,756,023 A | | 5/1998 | Stachowiak ............ 264/83 |
| 6,170,535 B1 | * | 1/2001 | Sadr et al. ............ 138/137 |
| 6,284,178 B1 | | 9/2001 | Russell et al. ............ 264/211.24 |
| 6,422,269 B1 | * | 7/2002 | Johansson et al. ............ 138/137 |
| 6,546,963 B1 | * | 4/2003 | Nuss ............ 138/141 |
| 6,615,877 B1 | * | 9/2003 | Zimmer et al. ............ 138/137 |
| 2004/0028860 A1 | * | 2/2004 | Dalal et al. ............ 428/36.91 |
| 2004/0045619 A1 | * | 3/2004 | Backman et al. ............ 138/137 |

FOREIGN PATENT DOCUMENTS

| DE | 296 22 414 U1 | 5/1997 |
| DE | 296 22 788 U1 | 7/1997 |
| EP | 0 030 091 A2 | 6/1981 |
| EP | 0 869 304 A2 | 10/1998 |
| EP | 1 152 181 A1 | 11/2001 |
| WO | WO 9949254 | 9/1999 |
| WO | WO 9957474 | 11/1999 |
| WO | WO 02/34513 A1 | 5/2002 |

OTHER PUBLICATIONS

Standards Australia, AS 2492-1994, "Cross-Linked Polyethylene (PE-X) Pipe For Hot And Cold Water Applications", pp. 5-28.

* cited by examiner

*Primary Examiner*—James Hook
(74) *Attorney, Agent, or Firm*—Joe A. Powell

(57) ABSTRACT

A multilayer PEX pipe having improved resistance to oxidizing agents in water. The pipe has a thin tubular core (inner layer) of high density polyethylene and an outer layer of crosslinked polyethylene. The pipe may optionally have an oxygen barrier layer, such as poly(ethylene-co-vinyl alcohol) ("EVOH"), contiguously disposed radially outward from the PEX layer. The pipe is suitable for potable water applications and for hot water radiant heating systems.

8 Claims, 3 Drawing Sheets

CROSSLINKED POLYETHYLENE PIPE HAVING A HIGH DENSITY POLYETHYLENE LINER

CROSS-REFERENCE TO RELATED APPLICATION

This application is filed pursuant to U.S. Provisional Application No. 60/397,862 filed on 23 Jul. 2002.

FIELD OF THE INVENTION

This invention relates to cross-linked polyethylene ("PEX") pipe such as is used in water distribution systems, and particularly in hot water systems. PEX pipe is susceptible to oxidizing agents which, over time, diffuse through the plastic causing oxidative degradation. Such degradation of PEX pipe occurs by reaction with, and diffusion of, oxygen from the atmosphere; and by reaction of oxidizing agents such as chlorine and hypochlorous acid present in the fluid carried by the pipe together with diffusion into the pipe of oxygen dissolved in the fluid. The susceptibility to degradation by reaction with free chlorine present in potable water, is described in an article titled "Chlorine Resistance Testing of Cross-linked Polyethylene Piping Materials" by P. Vibien, et al. of Jana Laboratories Inc., Ontario, Canada, and W. Zhou et al. of University of Illinois at Chicago, Chicago, Ill., U.S.A.

THE PROBLEM

Polyethylene ("PE") piping is commonly used for cold (10° C.–35° C.) water systems for potable water, irrigation at high pressure in the range from about 650 kPa (80 psig) to 1490 kPa (200 psig), and drainage waste water, a choice of LLDPE (linear low density PE), MDPE (medium density PE) or HDPE (high density PE) being directed by the conditions of usage of the pipe. Cross-linked PE ("PEX pipe") is used for domestic cold and hot water (10° C.–115° C.) as well as in radiant heating applications. Water at temperatures above 100° C., under pressure in the range from about 997 kPa (130 psig) to about 1135 kPa (150 psig), will rupture the pipe. Damage due to chlorine and hypochlorous acid in water has been found to be as damaging to PEX from within the pipe, as oxygen or other oxidizing agents, if not more so. The goal is to protect the PEX pipe against oxidative damage for a long time, up to 50 years.

BACKGROUND OF THE INVENTION

This invention relates to a flexible multilayer tubing (commonly referred to as "pipe") having an outer layer or outer sheath of crosslinked polyethylene (the recognized abbreviation for which is "PEX") and an inner layer or tubular core of high density polyethylene ("HDPE"), wherein polymer in the core has a substantially higher density than polymer in the outer sheath. Polyethylene ("PE") is generally regarded as being "high density polyethylene" or "HDPE" when its density is at least 0.941 g/cc (see Encyclopedia of Chemical Technology by Kirk & Othmer, Vol. 17, pg 704, 1996). Because the wall of the multiplayer pipe is predominantly PEX, the multiplayer pipe is referred to as "multilayer PEX pipe".

Plastic tubing denotes a particular diameter schedule of plastic pipe in which the outside diameter of the tubing is equal to the nominal size plus 3.175 mm or 0.125" (inch). Plastic pipe outside diameter schedule conforms to ANSI B 36.10. For convenience, and in deference to common usage, plastic tubing having a nominal diameter in the range from 7 mm to 152 mm is referred to hereinafter as "pipe".

It is well known in the art to subject polyethylene to a variety of crosslinking processes to produce PEX. Such crosslinking processes include addition of peroxide, addition of AZO compounds, electron beam irradiation, and addition of silane, each of which known to enhance certain physical and chemical properties of the polyethylene. In particular, crosslinking has been shown to increase maximum useful temperature, reduce creep, improve chemical resistance, increase abrasion resistance, improve memory characteristics, improve impact resistance, and improve environmental stress crack resistance compared to uncrosslinked polyethylene. For example, U.S. Pat. No. 4,117,195 discloses a method for producing PEX pipe using silane grafted PEX; U.S. Pat. No. 5,756,023 discloses several methods for producing PEX; and U.S. Pat. No. 6,284,178 discloses a method for making PEX having a low enough methanol extraction value (using the ANSI/NSF 61 standard), so as to qualify for use in potable water systems.

It is well recognized that PEX needs to be protected from oxidative degradation but it is also well known that chlorine and hypochlorous acid (HOCl) are just as detrimental to PEX pipe as oxidizing agents in the atmosphere, if not more so. To protect PEX against atmospheric degradants, antioxidants are added to the PEX. Little effort has been directed towards protecting PEX piping in water distribution systems in which degradation occurs not only from the oxygen in the atmosphere but also from chlorine and HOCl in the water migrating from the water into the pipe.

To provide protection in a water distribution system, a multilayer pipe having PEX as the core and an oxygen barrier layer outside the PEX layer is disclosed in PCT publication WO 99/49254; to overcome the mechanical limitations of PEX pipe is adhesively bonded to an outer layer of poly(ethylene-co-vinyl alcohol) ("EVOH") with another layer of adhesive which is stated to prevent cracking of the pipe, which would otherwise occur, when the pipe was expanded. No details are provided sufficient to enable one to determine the effectiveness of the combination without an undue amount of experimentation. EVOH is known to be an oxygen diffusion-resistant material, but is hydrolyzed in water and susceptible to degradation by chlorine and hypochlorous acid.

U.S. Pat. No. 4,614,208 discloses a multilayer pipe having PEX as the core and an intermediate layer of ("EVOH"), which is covered with an outer layer of impact resistant polyethylene.

If one was to recognize the importance of protection from within, it is expected that one could adhesively bond a tubular (or annular) core of a non-hydrolyzable polymer to the inner surface of PEX pipe, thus forming a barrier layer protecting the PEX against degradation from both chlorine and hypochlorous acid. But, there is no suggestion in the art which polymer provides such properties in a thin cross-section, in the range from as thin as 0.025 mm (1 mil) for 7 mm (0.25") nominal diameter pipe, to 1.52 mm (0.06") thick for 152 mm (6") nominal diameter pipe. Nor is there any suggestion that the polymer chosen be co-extrudable in that thickness under substantially the same extrusion conditions as PEX.

From the foregoing, it will be evident that the problem of coping with degradation of PEX pipe is addressed in diverse ways, few of which are focused on the detrimental long term effects of chlorine deliberately added to water. The effectiveness of HDPE was surprising because it is susceptible to degradation by chlorine and HOCl in water at elevated temperature above about 80° C., and elevated pressure above about 274 kPa (25 psig) over a long period of time more than 20 years; it is also to be expected that the higher crystallinity of HDPE would make it far more resistant to oxidation than PEX. Additionally, it is equally well known that the hoop stress of HDPE at 80° C. declines rapidly as a function of time; there is a visible decline after only 10 hr; the decline accelerates after 100 hr, and at the end of 1000 hr the hoop stress at failure for HDPE is only 2 $MN/m^2$ after having started out with a hoop stress of close to 8 $MN/m^2$ (see "Novel Crosslinking Method for Polyethylene" by H. G. Scott and J. F. Humphries, pgs. 82–85, Modern Plastics, March 1973). Viewing this 4-fold decrease in hoop stress at 80° C. one would not likely consider the use of HDPE in combination with PEX.

In sharp contrast, the hoop stress of PEX at 80° C. declines slowly as a function of time; at the end of 1000 hr the hoop stress at failure for PEX is 7 $MN/m^2$ after having started out with a hoop stress of about 11 $MN/m^2$ (see "Novel Crosslinking Method for Polyethylene" by H. G. Scott and J. F. Humphries, pgs. 82–85, Modern Plastics, March 1973). Because typical hot water piping systems are designed for operation at 80° C., there is even more reason to be concerned with the decrease in hoop stress which would be contributed by the HDPE.

SUMMARY OF THE INVENTION

A 4-fold decrease in hoop stress of HDPE at 80° C. compared with the much lower susceptibility of PEX at the same temperature, is found acceptable for PEX pipe with an expected useful life of about 50 years because of (i) the adequate resistance of HDPE to degradation due to chlorine and hypochlorous acid in water during that period, and (ii) the poor hoop stress of HDPE does not affect the hoop stress of the PEX-HDPE laminate provided the wall thickness of the HDPE core is less than 1.52 mm (0.06") for the largest nominal diameter PEX pipe to be made, namely 152 mm (6"). Thus, a multilayered pipe in which the PEX wall is typically about 10 times or more thicker than the wall of its innermost tubular HDPE core, provides excellent protection against degradation from chemicals in water carried in the pipe. For non-SDR-9 (standard diameter ratio) pipe having a nominal diameter of 7 mm (0.25") and 10 mm (0.375") the ratio of the specified nominal diameter to the maximum wall thickness of inner tubular HDPE core is 28 for 7 mm pipe, and 40 for 10 mm pipe the minimum wall thickness of PEX being 1.57 mm for 7 mm pipe, and 1.78 mm for 10 mm pipe. For SDR-9 pipe having a nominal diameter. in the range from 13 mm (0.5") to 152 mm (6") the ratio of the specified nominal diameter maximum to the maximum wall thickness of the inner tubular HDPE core is in the narrow range from 52 to 100, the minimum wall thickness of PEX being 1.78 mm for 13 mm pipe and 17.29 mm for 152 mm pipe.

To provide a mainly PEX pipe which has improved resistance to oxidation attack by oxidizing agents, particularly by chlorine and hypochlorous acid carried within the pipe, the PEX pipe is extruded over and melt-bonded to a thin-walled inner tubular core of HDPE.

A single-step process for forming a multilayer PEX pipe having at least two layers (twin-layered pipe) yields pipe having an inner tubular core of HDPE having a maximum wall thickness in the range from about 28 to 100 times smaller than the nominal diameter of pipe in the range from 7 mm (0.25") to 152 mm (6"), the smallest ratio (28) being attributable to the smallest diameter non-SDR-9 piping (7 mm or 0.25") and the largest (100) being attributable to the largest diameter SDR-9 pipe generally made, provided the PEX and HDPE are co-extrudable under similar temperature conditions, that is, within 50° C. of one another. This thin annular core of HDPE provides improved resistance to attack by oxidation agents such as chlorine and hypochlorous acid without significantly decreasing the hoop stress of the multilayered pipe, that is, the hoop stress decreases less than 15%. The thin annular core of HDPE is critically related to the overall wall thickness of multilayered PEX pipe to be made, as it must necessarily conform to a requirement of wall thickness for the PEX alone, which thickness is specified by piping codes, and the cross-section of the thin annular layer is required to be substantially uniform, that is, have less than a ±0.05 mm variance in wall thickness for pipe in the range from 13 mm to 51 mm nominal diameter.

Though HDPE which is not crosslinked is effective, crosslinked HDPE is equally effective provided it is not so heavily crosslinked as to be non-extrudable in the single-step process used herein. If desired, HDPE may be heavily crosslinked after the pipe is formed, for example, by irradiating with an electron beam of suitable intensity; the resulting heavily crosslinked pipe may then be formed into a twin-layered pipe in a two-step process in which the crosslinked HDPE pipe is advanced as a sleeve into a die in which PEX is extruded over the HDPE, provided the relative inflexibility of the pipe is acceptable.

These and other objects are achieved by co-extruding a multilayer pipe having an inner tubular core of HDPE and at least one outer layer of PEX, wherein the HDPE has a density in the range from 0.941 g/cc to 0.963 g/cc and the contiguous outer layer is PEX.

BRIEF DESCRIPTION OF THE DRAWINGS

The foregoing and additional objects of the invention will best be understood by reference to the following detailed description, accompanied with schematic illustrations of preferred embodiments of the invention, in which illustrations like reference numerals refer to like elements.

DETAILED DESCRIPTION OF THE PREFERRED EMBODIMENTS

The specific multi-layer pipe having an outer layer of PEX and a tubular core of HDPE, whether SDR-9 or non-SDR-9, is resistant to chlorine and HOCl in water, and has substantially the same outer diameter as conventional PEX pipe. The extrudate has a nominal diameter in the range from about 7 mm (0.25") to 10 mm (0.375") for non-SDR- 9 pipe having a wall thickness in the range from 1.57 mm (0.062") to 1.78 mm (0.070") respectively; and has a nominal diameter in the range from 13 mm (0.5") to 152 mm (6") for SDR-9 pipe having a wall thickness in the range from about 1.78 mm (0.070") to 17.29 mm (0.681") respectively as specified in ASTM F876 and F877, the wall thickness depending upon the particular nominal diameter; overall dimensions of the novel pipe meet the specifications set for its use in a chosen environment; the thickness of the core, in each case, being sufficient to substantially negate oxidative degradation of the PEX outer layer by oxidizing agents present in potable water. The wall thickness of the tubular core is measured in the radial direction and the wall thickness of the contiguous outer sheath of PEX, whether one or more layers of PEX, is at least as thick as the minimum wall thickness mandated by the plumbing code for a pipe having the specified nominal diameter.

Figure 4:
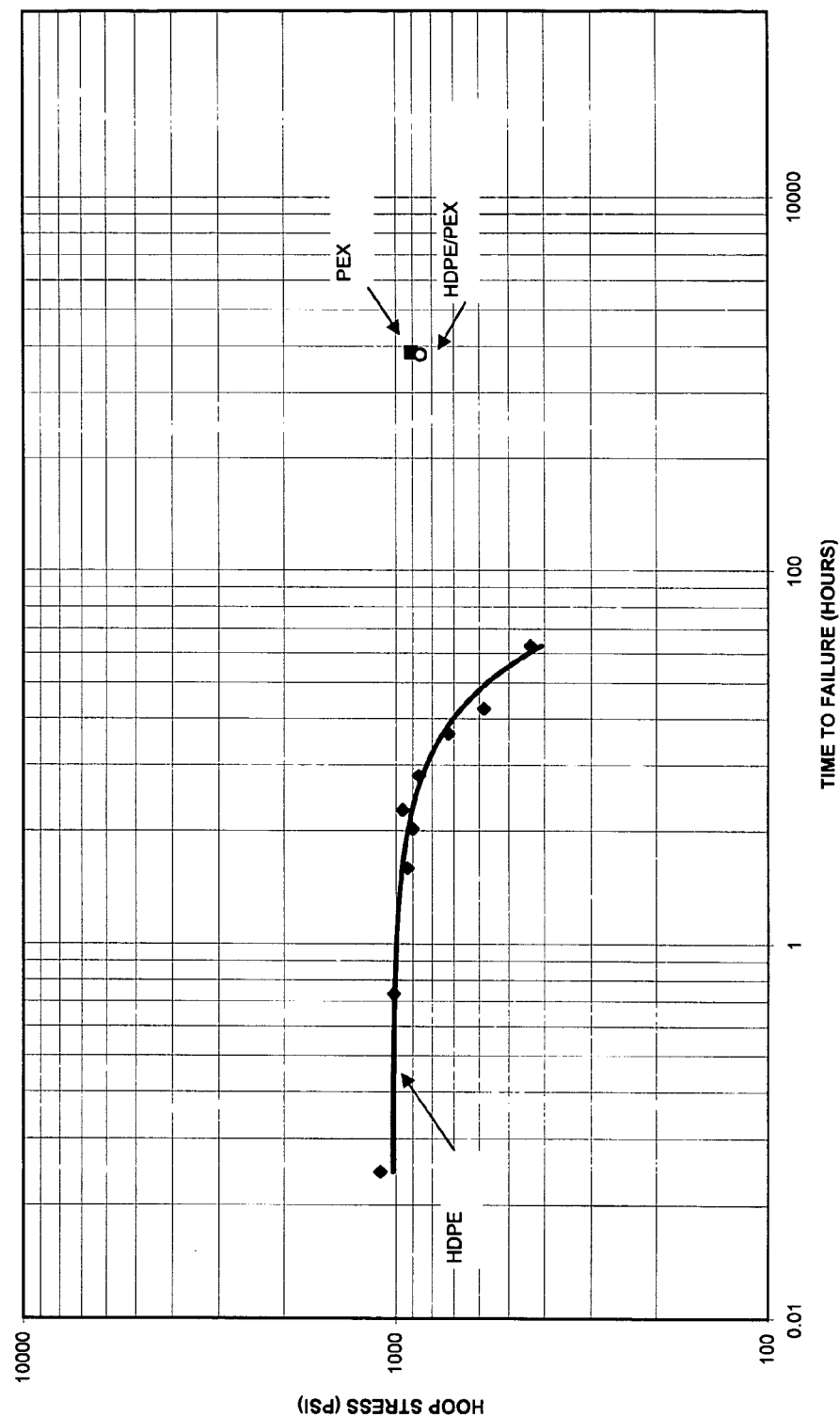
FIG. 4 is a graph showing (i) hoop stress as a function of time for a single layer of 13 mm nominal diameter HDPE pipe, (ii) hoop stress as a function of time for a single layer of 13 mm nominal diameter PEX pipe, and (iii) hoop stress as a function of time for a twin-layer pipe in which the inner tubular core is HDPE, having a wall thickness of 0.05 mm and the outer contiguous layer is PEX which conforms to SDR-9 dimensions.

Referring to FIG. 4, there is shown the hoop stress measured as specified by ASTM D2837 for pipe made of various types of polyethylene through which water at 82° C. (180 F.) is held. It is seen that the continuous curve fitted through points representing the hoop stress of HDPE pipe at various intervals of time shows that the hoop stress declines visibly soon after the test is started, and has decreased 15% after only 10 hr; at the end of 40 hr the hoop stress at failure for HDPE is only 3 MN/m$^2$ after having started out with a hoop stress of close to 8 MN/m$^2$. These results confirm those obtained by Scott et al. (supra). Referring now to the curve for the twin-layered pipe, it is seen that there is no visible decrease in hoop stress due to the inner core of HDPE, even after 1500 hr.

In a preferred embodiment, the wall of the HDPE inner core is extruded from commercially available HDPE having a density in the range from about 0.95 to 0.96 g/cm$^3$, the denser the HDPE the higher its crystallinity.

The HDPE inner core contains known processing aids, stabilizers, antioxidants, antiozonants, and the like which may be present in an amount from 10 ppm to about 7 parts per hundred of the HDPE. Preferred primary antioxidants are hindered phenols, including those commercially available as Irganox® 1010, 1076 and B215; secondary antioxidants including those commercially available as Irgafos® 168 and Irganox® PS802, function as thermal processing stabilizers; pigments include titanium dioxide and carbon black; and, lubricants including fluorinated flow aids.

The PEX outer sheath is preferably PEX crosslinked to a gel level greater than 65% as measured according to ASTM D2765, and more preferably, PEX crosslinked to a gel level greater than 70%.

Cross-linking in the PEX may be produced either chemically by reactive functional groups, or by free radical reaction; the former is typically effected with silane cross-linking, while the latter is effected either by irradiation or with a peroxide cross-linking agent as for example in the Engel process. Irradiative cross-linking typically occurs at room temperature by electron bombardment with critical control. Most preferred is cross-linking with vinylalkoxysilane groups grafted onto a PE backbone in a separate extrusion process. Pellets of the grafted PE are mixed with a masterbatch containing a catalyst, stabilizer, pigment, processing aid, antioxidant, etc. and extruded to yield a partially cross-linked PE pipe. This pipe is further cross-linked by exposure to water.

Preferred processes for making PEX are known in the art as the Sioplas process and the Monosil process, with the Sioplas process being preferred. In the Sioplas process, a polyethylene resin is melted and vinyltrimethoxysilane or vinyltriethoxysilane is added to the melted polyethylene along with a catalyst, such as a peroxide initiator. Functional reaction sites are thereby formed on the polyethylene polymer chains at which crosslinking will occur, typically by exposure to moisture. The grafted resin is pelletized and stored for later use in containers such as foil-lined bags, to protect the resin from moisture.

A masterbatch which contains catalyst ("catalyst masterbatch") is prepared before it is mixed with the grafted resin. This masterbatch typically includes a predetermined amount of PE; a catalyst, such as a dibutyl tin dilaurate; a primary antioxidant, such as a hindered phenol commercially available as Irganox® 1010, 1076 and B215; and a secondary antioxidant commercially available as Irgafos® 168, and Irganox® PS 802. Additionally, a hindered amine light (UV) stabilizer such as Tinuvin® 111 and pigments such as titanium dioxide and carbon black may also be used. The catalyst masterbatch is typically pelletized for ease of mixing with the grafted resin in a conventional extruder.

The grafted resin and catalyst masterbatch are usually combined in a specific ratio, melted and mixed together and extruded. When the grafted polyethylene resin and catalyst masterbatch are mixed together, crosslinking of the polyethylene at the silane graft sites accelerates. The material exits the extruder and is typically cooled.

To produce the multilayer pipe of this invention, a co-extrusion process is used. In the co-extrusion process, two or more extruders are used, one extruder for each material or layer in the pipe. For a twin-layer pipe, two extruders are used; and for a trilayer pipe, three extruders are used. The extruders are typically displaced 90° from each other. The plural extruders feed into a multi-layer pipe die head such as is commercially available from Rollepaal and illustrated in their sales brochure.

The temperature of each of the plural zones along the longitudinal axial length of the die head allows the temperature of each zone to be adjusted so as to gradually heat the laminate being formed. A first extruder flows PEX into a first port in the die head, and a second extruder flows HDPE into a second port in the die head. From the second port, the HDPE flows into distribution branches which are in open communication with an inner annular zone, and then over a frustoconical mandrel. From the first port, the PEX flows into distribution branches which are in open communication with an outer annular zone and then over the HDPE flowing over the mandrel. When the tubular inner core of HDPE contacts the inner surface of the outer PEX pipe being formed, a twin-layer tubular laminate is formed in which the two layers are melt bonded together, or cohesively bonded, such than no adhesive is required. To retain its cylindrical shape and predetermined size, the twin-layer pipe is passed through sizing blocks as it is cooled below its melt temperature. The field of co-extrusion is a well known art and, for brevity, need not be described in greater detail in this specification.

Once the twin-layer pipe is extruded, the crosslinking for the PEX layer is completed to the desired level (usually about 70–85% gel level) by exposure to moisture. The exposure to moisture may be by atmospheric moisture (humidity); crosslinking can be accelerated by using hot water or steam.

In the foregoing description, the material referred to as PEX may be partially crosslinked at the time of mixing and extruding but is further crosslinked to the desired level after the pipe is formed.

Figure 1:
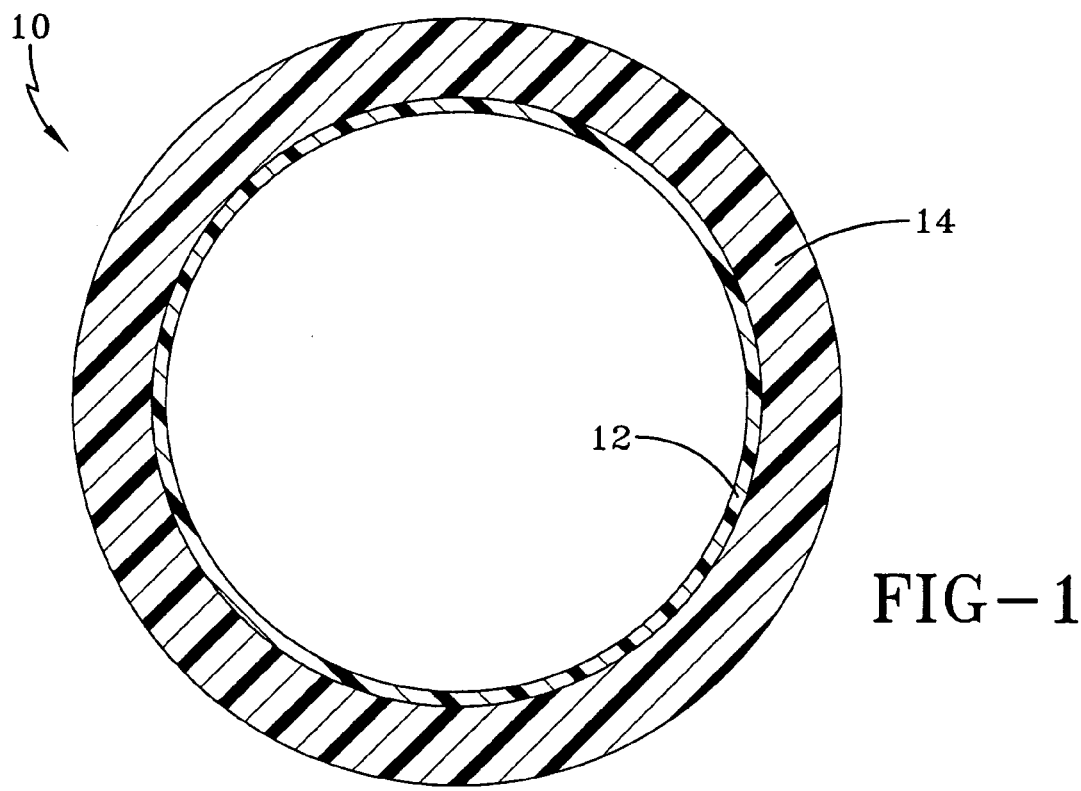
FIG. 1 is a cross-sectional view not to scale, of a twin-layer pipe having an inner tubular core of HDPE and an outer layer of PEX.

The invention will be better understood by referring to the drawings in which FIG. 1 shows a twin-layer pipe 10 having an inner tubular core layer 12 of HDPE, and an outer sheath 14 of a single layer of PEX.

Figure 2:
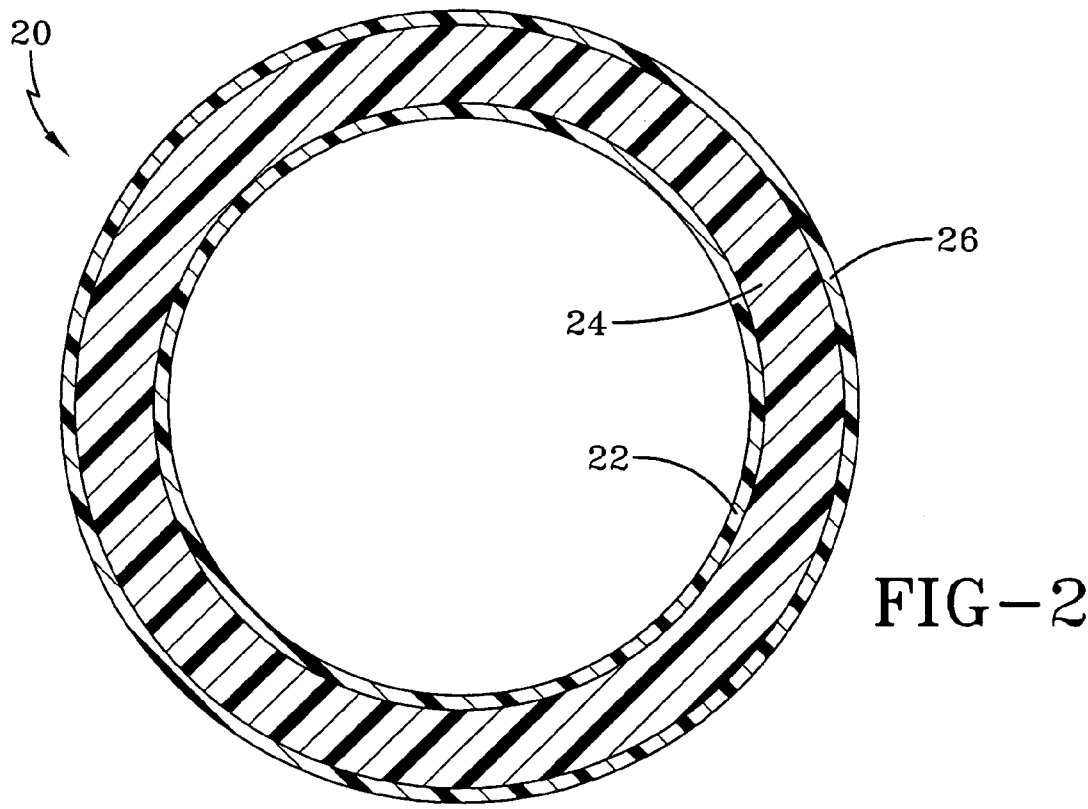
FIG. 2 is a cross-sectional view not to scale, of a trilayer pipe having an inner tubular core of HDPE and successive outer layers of PEX, the outermost layer being dyed or pigmented according to a predetermined code, that is, colored.

Referring to FIG. 2, there is shown a tri-layer pipe 20 having an inner core 22 of HDPE and an outer sheath comprising successive contiguous melt-bonded first and second outer layers 24 and 26 respectively, of PEX, each radially successively outward from the inner layer 22, the second layer 26 of PEX being outermost. The function of the outermost layer 26, in addition to reinforcing the first layer 24, is to differentiate one section of pipe for a particular application (e.g., hot water) from another section for another application (e.g., cold water). For example, it is desirable to use differently color-coded PEX of substantially the same density, each pigmented with a pigment of chosen color, to produce the second layer 26. The second layer 26 may be pigmented with red pigment to indicate a pipe for carrying hot water, and with blue pigment to indicate pipe for carrying cold water, thus facilitating installation of the pipe.

Figure 3:
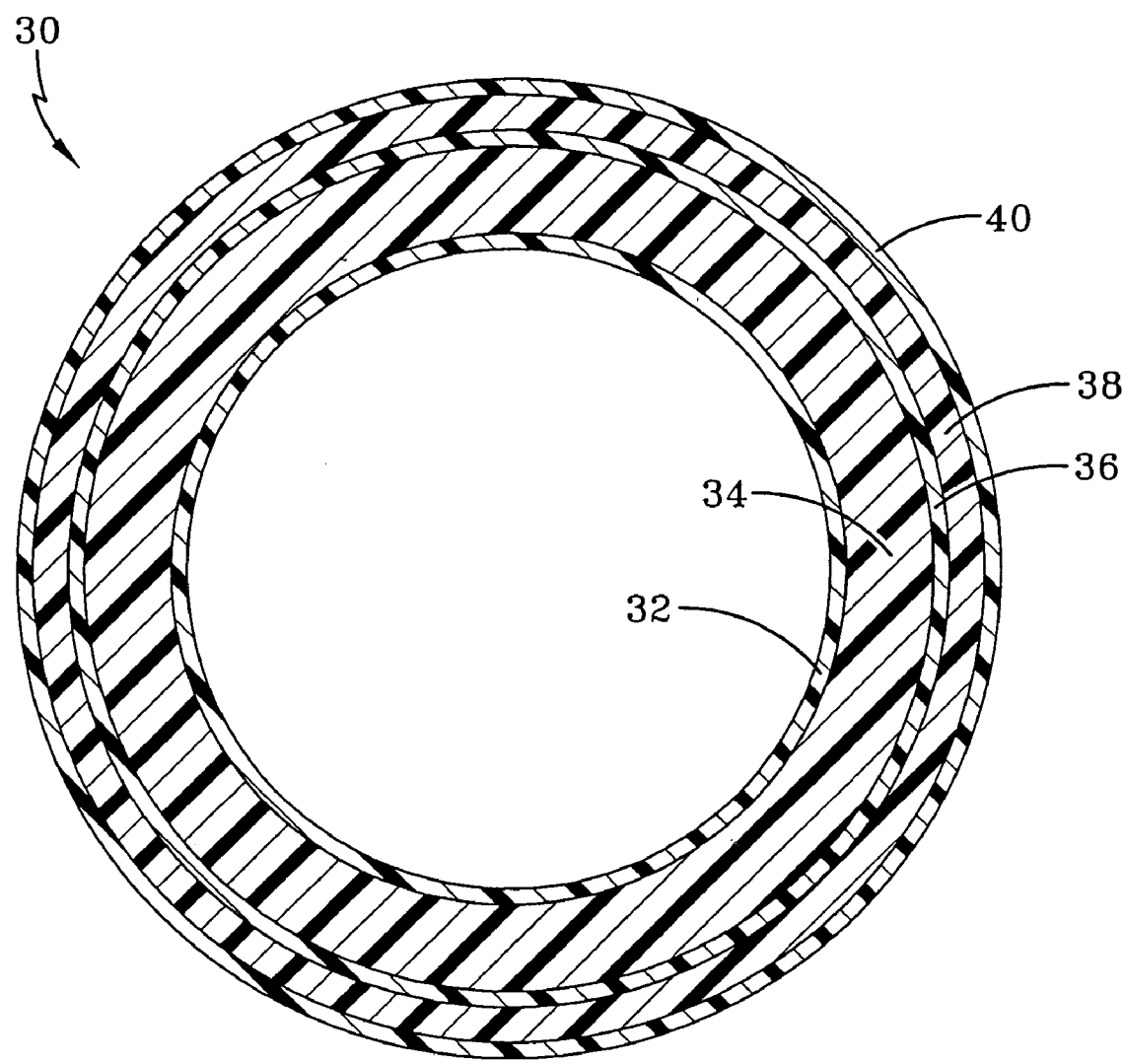
FIG. 3 is a cross-sectional view not to scale, of a five layer pipe having an inner tubular core of HDPE, an intermediate layer of PEX cohesively bonded the outer surface of the HDPE core, and an outer barrier layer of an ethylene vinyl alcohol copolymer ("EVOH") adhesively bonded with a layer of adhesive to the outer surface of the PEX layer.

Referring to FIG. 3, there is shown an embodiment of a large diameter pipe 30, typically greater than 25 mm (1") nominal diameter, having five successive layers, each contiguous with the preceding layer, the core being innermost layer 32 of HDPE. An intermediate layer 34 of PEX is melt-bonded to the outer surface of the core 32, and an oxygen barrier layer 38 of EVOH is adhesively bonded to the outer surface of the PEX layer with an adhesive layer 36. The EVOH layer 38 attenuates migration of atmospheric gases, particularly oxygen, which is known to be harmful to a water boiler.

To produce a multilayer pipe with an outer sheath of EVOH, a co-extrusion process is used. In this co-extrusion process, four or five extruders are used, one extruder for each different material to be extruded as a layer. A specially designed die receives extrudates from five extruders each extrudate forming one of the five layers illustrated in FIG. 3. The design of the die is generally similar to the design of a Rollepaal die.

Though EVOH provides a convenient barrier layer 38, the choice of material is not narrowly critical, any extrudable effective oxygen barrier material may be substituted for the EVOH. For better protection, the EVOH, or both layers 38 and 40 may be replaced with aluminum foil, or a material other than polyethylene which presents a barrier to diffusion of oxygen. Alternatively, in addition to that provided by the EVOH, aluminum foil (not shown) may be adhesively secured over the EVOH with a suitable adhesive 40 which will bond the aluminum to the EVOH.

The multilayer pipe as shown in FIGS. 1–3 has a nominal diameter in the range of from 7 mm (0.25" non-SDR-9) to a maximum of about 152 mm (6" SDR-9) and a wall thickness in the range from about 1.57 mm (0.062") to about 17.29 mm (0.681"), respectively. The nominal diameter of pipe as well as its inside diameter is dictated by plumbing codes, as is the minimum and maximum outside diameter of the PEX for that nominal diameter pipe. Therefore, the maximum wall thickness of the inner HDPE layer is dictated by the minimum inside diameter, the minimum thickness of PEX, and the maximum outside diameter of the pipe, specified by the code. This can be better understood by referring to the dimensional conformance section below.

Dimensional Conformance

The following dimensions (given in inches in parentheses) are specified by ASTM F-876 and F-877 for a particular SDR-9 PEX pipe having a wall of PEX alone:

| Nominal dia. | Outside dia. | Wall Thickness |
|---|---|---|
| 19 mm | 22.22 mm ± 0.10 | 2.47 mm ± 0.25 |
| (0.75 in.) | (0.875 in. ± 0.004) | (0.097 in. ± 0.010) |

The foregoing dimensions specify a minimum PEX wall thickness of 2.47 mm and a maximum PEX wall thickness of 2.72 mm; thus, in a twin-layer PEX/HDPE pipe the maximum wall thickness of the inner HDPE layer is 0.25 mm (10 mils).

The minimum wall thickness of HDPE will be dictated by the degree of protection sought and the technical feasibility of extruding the desired minimum substantially uniform wall thickness of HDPE desired.

An example below provides two sections of PEX pipe having the same nominal diameter, a first section having an inner HDPE layer 0.05 mm (2 mils) thick, and a second section having an inner HDPE layer 0.010 mm (4 mils) thick; and the effect the thickness of each inner layer has when the required tolerances are to be maintained to be code-acceptable.

| PEX Wall Thickness Range (mm) | Inner Layer Wall Thickness (mm) | Overall Pipe Wall Thickness Range (mm) |
|---|---|---|
| 2.47–2.67 | 0.05 | 2.52–2.72 |
| (0.097–0.105 in.) | (0.002 in.) | (0.099–0.107 in.) |
| 2.47–2.62 | 0.10 | 2.57–2.72 |
| (0.097–0.103 in.) | (0.004 in.) | (0.101–0.107 in.) |

The wall thickness of the tubular core inner layer of high density polyethylene measured in the radial direction, is preferably in the range from about 0.025 mm (1 mil), typically for small diameter pipe less than 25 mm nominal diameter., to about 0.50 mm (20 mils) for larger diameter pipe up to about 152 mm in nominal diameter.

The PEX pipe is continuously extruded, therefore of arbitrary length which pipe is then coiled onto a large spool from which it is unwound and cut to a specified length; alternatively, the extrudate is cut into sections of desired length. The pipe may be assembled using standard crimp type fittings as are commercially available and well known in the art.

EXAMPLE 1

A twin layer pipe, illustrated in FIG. 1, is made by co-extruding an uncrosslinked HDPE inner layer and a PEX outer layer. Internal components of a 25.4 mm (1") extrusion die were modified by configuring the plate to allow for a two-layer piping structure. The pipe structure was set to extrude a thin HDPE layer inside a thicker cross-linkable silane grafted PE outer layer.

A commercially available silane grafted PE base resin (Flexet 5100 from AT Plastics) having a density of 0.945 g/cm$^3$ measured according to ASTM D1505 and a melt index of 35 g/10 min measured according to ASTM D1238 (190° C. and 21.6 Kg) was mixed with a commercially available catalyst masterbatch (Flexet 728 from AT Plastics) having a melt index of 1.5 g/10 min measured according to ASTM D1238 (190° C. and 2.16 Kg), and a density of 0.935 g/cm$^3$ measured according to ASTM D1505. The mixture contained 96 wt. % silane grafted PE and 4 wt. % catalyst masterbatch. The blend was fed into a hopper located on a 2½" Davis-Standard single screw extruder. The extruder was equipped with a general purpose polyolefin processing screw and breaker plate. Processing conditions are set forth in Table I below:

TABLE I

| Variable | Conditions |
| --- | --- |
| Zone 1 setpoint | 165.5° C. (330° F.) |
| Zone 2 setpoint | 168.3° C. (335° F.) |
| Zone 3 setpoint | 171.1° C. (340° F.) |
| Zone 4 setpoint | 173.9° C. (345° F.) |
| Die 1 setpoint | 182.2° C. (360° F.) |
| Die 2 setpoint | 182.2° C. (360° F.) |
| Die 3 setpoint | 185° C. (365° F.) |
| Die 4 setpoint | 185° C. (365° F.) |
| Screw RPM | 24 |
| Screw Amps | 7 |

A 1½" Davis-Standard (general designation) single screw extruder was used to extrude the HDPE inner layer. The HDPE base resin had a density of 0.953 g/cm$^3$ measured according to ASTM D4883. 0.044 weight percent of a blue color pigment was present in the HDPE.

Pellets of the HDPE are fed into a hopper located on the extruder. The extruder is equipped with a general purpose polyolefin processing screw and breaker plate. Processing conditions are set forth in Table II below:

TABLE II

| Variable | Conditions |
| --- | --- |
| Zone 1 setpoint | 168.3° C. (335° F.) |
| Zone 2 setpoint | 171.1° C. (340° F.) |
| Zone 3 setpoint | 173.9° C. (345° F.) |
| Zone 4 setpoint | 176.7° C. (350° F.) |
| Clamp setpoint | 179.4° C. (355° F.) |
| Die 1 setpoint | 182.2° C. (360° F.) |
| Screw RPM | 10 |
| Screw Amps | 5.1 |

A twin layer pipe was co-extruded at a rate of 40 kg/hr, having an average inner layer thickness of 0.006" (0.15 mm) and an average outer layer thickness of 0.108" (2.74 mm). The average outside diameter was 1.298" (33.0 mm).

The co-extruded pipe is placed in a water bath set to 82° C. for 16 hours to further cross-link the PEX outer layer. The final pipe thus has a PEX outer layer that has a gel content greater than 70% as measured according to ASTM D2765.

The twin layer pipe with protective HDPE inner layer was compared for oxidation resistance to a single layer PEX pipe of identical formulation and similar dimensions. Both samples were exposed for 2800 hours to a highly oxidative environment according to the NSF P171 Chlorine Resistance Protocol at the following conditions: 105° C., 57 psi, 4.0 ppm free chlorine and pH=6.8. Radial shavings were cut from 0.020" and 0.040" depths in from the inner surface of the pipes. Three samples were taken at 0.020" depth and two samples at 0.040" depth. These samples were then tested for Oxygen Induction Time according to ASTM D-3895. The relative oxidative ratio (OIT of lined pipe at radial depth X/OIT of unlined pipe at radial depth X) are presented in the Table III below:

TABLE III

| Radial Depth | Relative Oxidative Ratio (Single Layer Pipe = 1.0) |
| --- | --- |
| 0.020" | 1.82 |
| 0.020" | 1.73 |
| 0.020" | 1.56 |
| 0.040" | 1.31 |
| 0.040" | 1.37 |

The relative oxidative ratio being greater than 1 at both radial depths, is evidence that the HDPE-lined pipe has better oxidative resistance than the unlined pipe.

What is claimed is:

1. A multilayer crosslinked polyethylene ("PEX") pipe comprising:
    (a) an inner tubular core of high density polyethylene ("HDPE") having a maximum wall thickness from about 28 to 100 times smaller than the nominal diameter of pipe in the range from 7 mm (0.25") to 152 mm (6"), ratio 28 being attributable to small diameter non-SDR-9 piping, and ratio 100 being attributable to the larger diameter SDR-9 pipe, wherein the HDPE has a density in the range from 0.941 g/cc to 0.963 g/cc; and,
    (b) an outer tubular sheath of at least one layer of a crosslinked polyethylene contiguous with the outer surface of the inner core layer, wherein said PEX is crosslinked to a gel level of at least 65% by a silane grafting process.

2. The multilayer pipe of claim 1 wherein the HDPE has a density in the range from about 0.950 to about 0.963 g/cm$^3$.

3. The multilayer pipe of claim 2 wherein the inner core has a wall thickness in die range from at least 0.025 mm (1 mil) to about 1.52 mm (0.06") thick for pipe having a nominal diameter in the range from 7 mm (0.25") to 152 mm (6").

4. The multilayer pipe of claim 3 wherein the inner core has a wall thickness in the range from about 0.05 mm (2 mil) to 0.1 mm (4 mils) for pipe having a nominal diameter in the range from 13 mm (0.5") to 25mm (1") and the gel level is greater than 70%.

5. The multilayer pipe of claim 3 wherein the sheath includes successive inner and outer contiguous layers of PEX melt-bonded to one and another, the outer layer being color-coded.

6. A three layer PEX pipe comprising:
    (a) an inner tubular core layer of high density polyethylene (HDPE) having a maximum wall thickness from about 28 to 100 times smaller than the nominal diameter of pipe in the range from 7 mm (0.25") to 152 mm (6"), ratio 28 being attributable to small diameter non-SDR-9 piping, and ratio 100 being attributable to the larger diameter SDR-9 pipe, wherein the 1HDPE has a density in the range from 0.941 g/cc to 0.963 g/cc;
    (b) an intermediate tubular layer of crosslinked polyethylene (PEX) having a gel level of at least 65% contiguously disposed radially outward from the core layer; and,
    (c) an outer tubular layer of PEX having a gel level of at least 65%, wherein said outer tubular layer is color-coded for installation in a chosen service.

7. A multilayer pipe comprising:
    (a) an inner tubular core layer of high density polyethylene (HDPE) having a maximum wall thickness from about 28 to 100 times smaller than the nominal diameter of pipe in the range from 7 mm (0.25") to 152 mm (6"), ratio 28 being attributable to small diameter non-SDR-9 piping, and ratio 100 being attributable to the larger diameter SDR-9 pipe, wherein the HDPE has a density in the range from 0.941 g/cc to 0.963 g/cc;

(b) an intermediate tubular layer of crosslinked polyethylene (PEX) having a gel level of at least 65%, contiguously disposed radially outward from the core layer, (c) an oxygen barrier of material other than polyethylene disposed radially outward from said intermediate layer.

8. A process for producing a multilayer pipe comprising co-extruding:

(a) an inner tubular core layer of high density polyethylene (HDPE) having a maximum wall thickness from about 28 to 100 times smaller than the nominal diameter of pipe in the range from 7 mm (0.25") to 152 mm (6"), ratio 28 being attributable to small diameter non-SDR-9 piping, and ratio 100 being attributable to the larger diameter SDR-9 pipe, wherein the 1HDPE has a density in the range from 0.941 g/cc to 0.963 g/cc;

(b) an outer tubular core of at least one layer of crosslinkable polyethylene melt bonded to the outer surface of the inner core layer without the use of adhesive; and, (c) crosslinking by a silane grafting process at least the outer layer to have a gel content of at least 65%.

* * * * *